United States Patent
Huizenga

(10) Patent No.: US 12,215,725 B2
(45) Date of Patent: Feb. 4, 2025

(54) GRIPPING BRACKET

(71) Applicant: Don Huizenga, Anoka, MN (US)

(72) Inventor: Don Huizenga, Anoka, MN (US)

( * ) Notice: Subject to any disclaimer, the term of this patent is extended or adjusted under 35 U.S.C. 154(b) by 0 days.

(21) Appl. No.: 18/231,678

(22) Filed: Aug. 8, 2023

(65) Prior Publication Data
US 2023/0392622 A1 Dec. 7, 2023

Related U.S. Application Data

(63) Continuation of application No. 16/530,268, filed on Aug. 2, 2019, now Pat. No. 11,746,804.

(51) Int. Cl.
*F16B 2/04* (2006.01)

(52) U.S. Cl.
CPC ..................... *F16B 2/04* (2013.01)

(58) Field of Classification Search
CPC .............. E04F 13/0864; E04F 21/1838; E04F 21/1855; E04D 1/34; E06B 1/6015; E04B 2002/7475; F16B 2/04
See application file for complete search history.

(56) References Cited

U.S. PATENT DOCUMENTS

| | | | | |
|---|---|---|---|---|
| 2,565,610 | A * | 8/1951 | Kinghorn | E04D 3/363 52/522 |
| 5,537,791 | A * | 7/1996 | Champagne | E04F 13/0864 52/489.1 |
| 5,606,835 | A * | 3/1997 | Champagne | E04F 13/0842 52/712 |
| 5,634,314 | A * | 6/1997 | Champagne | F16B 2/245 52/712 |
| 6,367,220 | B1 | 4/2002 | Krause et al. | |
| 6,718,599 | B2 * | 4/2004 | Dickinson | F16B 21/075 24/295 |
| 7,424,795 | B2 * | 9/2008 | Baxter | B29C 48/07 D25/139 |
| 7,698,867 | B1 * | 4/2010 | Stucko | E04F 13/0864 52/712 |
| 11,746,804 | B2 | 9/2023 | Huizenga | |

* cited by examiner

*Primary Examiner* — Christopher Garft
(74) *Attorney, Agent, or Firm* — Crawford Maunu PLLC

(57) ABSTRACT

Aspects of the disclosure are directed to brackets, their manufacture and use, such as may involve securing siding and/or other building materials. As may be implemented in accordance with one or more embodiments, an apparatus includes a front side, a back side, and a top side connecting the front side and the back side, the front, back and top sides (e.g., as a bracket) forming boundaries that bound three sides of an opening. A grip fastener is coupled to the front side and extends inward toward the opening and toward both the back and top sides at an incline relative to the front side. Another grip fastener is coupled to the back side and extends inward toward the opening and both the top and front sides at an incline relative to the back side.

20 Claims, 5 Drawing Sheets

GRIPPING BRACKET

OVERVIEW

For many applications, it is desirable to secure components to one another, such as when assembling different components together. However, doing so can be challenging. For instance, properly aligning components that are being fastened to one another can be important, yet doing so in a fast and efficient manner can be challenging. In regard to building construction, aligning and installing siding and other interacting components can be particularly challenging in this regard. For instance, multiple pieces of siding and other components such as J channels may be needed to facilitate alignment and installation of trim, such as that utilized under window sills and other structural components.

These and other matters have presented challenges to the assembly of components, as may relate to building materials and a variety of applications.

SUMMARY

Various example embodiments are directed to brackets, their application and their manufacture. Such embodiments may be useful for assembling building components such as siding, or other thin or sheet-type components.

As may be implemented in accordance with one or more embodiments, an apparatus includes a front side, a back side, and a top side connecting the front side and the back side. The front, back and top sides forming boundaries (e.g., as a bracket) that bound three sides of an opening. A grip fastener is coupled to the front side and extends inward toward the opening and toward both the back and top sides at an incline relative to the front side. Another grip fastener is coupled to the back side and extends inward toward the opening and both the top and front sides at an incline relative to the back side. In various embodiments, the grip fasteners may operate with each other and the front, back and top sides to, in response to insertion of siding material into a region of the opening bound by the front, back and top sides and past the grip fasteners in a direction toward the top side, engage with and lock the siding material by resisting a moment of bending of the grip fasteners toward the opening, relative to the sides to which the grip fasteners are connected.

Another embodiment is directed to an apparatus comprising a bracket including a front side a back side, and a top side connecting the front side and the back side, the front, back and top sides forming boundaries that bound three sides of an opening configured for receiving building material. Grip fasteners are coupled to the front side and to the back side, the grip fasteners being configured and arranged with the bracket to facilitate insertion of the building material into a region of the opening bound by the front, back and top sides and past the grip fasteners in a direction toward the top side. The grip fasteners are further configured with the bracket to, after insertion of the building material, lock the building material in place by engaging with and preventing the building material from being withdrawn from the opening in a direction away from the top side.

Another embodiment is directed to a method comprising providing a bracket and a plurality of grip fasteners, and using the bracket and grip fasteners to secure building material. The bracket includes a front side, a back side, and a top side connecting the front side and the back side, the front, back and top sides forming boundaries that bound three sides of an opening. The grip fasteners include grip fasteners coupled to the front side and other grip fasteners coupled to the back side. Building material is inserted into a region of the opening bound by the front, back and top sides and past the grip fasteners in a direction toward the top side. After inserting the building material, the building material is locked in place by engaging with and preventing the building material from being withdrawn from the opening in a direction away from the top side.

The above discussion/summary is not intended to describe each embodiment or every implementation of the present disclosure. The figures and detailed description that follow also exemplify various embodiments.

BRIEF DESCRIPTION OF FIGURES

Various example embodiments may be more completely understood in consideration of the following detailed description and in connection with the accompanying drawings, in which.

Figure 1A:
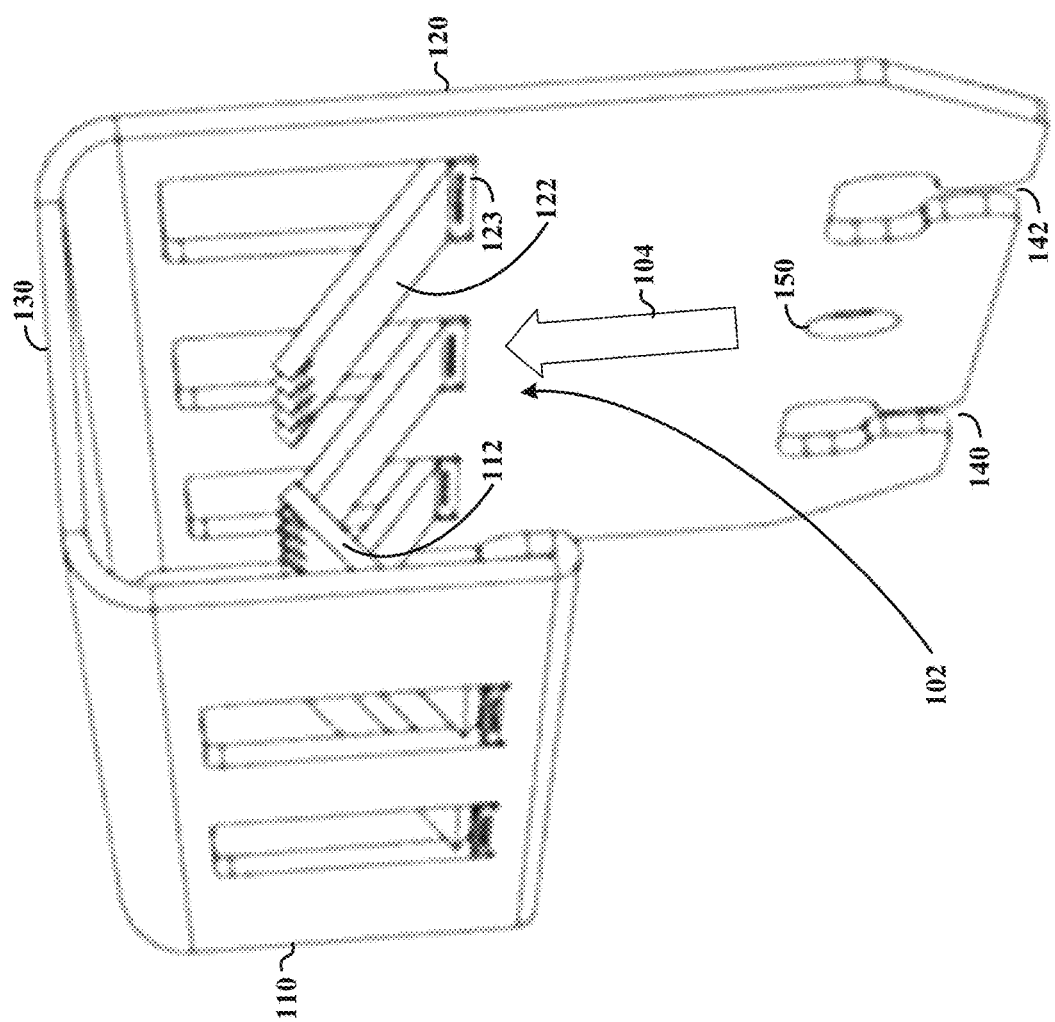
FIGS. 1A-1C show perspective and respective end views of a gripping bracket, in accordance with one or more embodiments.

While various embodiments discussed herein are amenable to modifications and alternative forms, aspects thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the disclosure including aspects defined in the claims. In addition, the term "example" as may be used throughout this application is by way of illustration, and not limitation.

DETAILED DESCRIPTION

Aspects of the present disclosure are believed to be applicable to a variety of different types of articles of manufacture, apparatuses, systems and methods involving gripping mechanisms and their applications. In certain implementations, aspects of the present disclosure have been shown to be beneficial when used in the context of gripping brackets utilized for gripping components for fastening. More particular aspects are directed to a gripping bracket configured for gripping siding materials utilized in building construction, and may be configured with related componentry to match characteristics of the type of siding materials being assembled. While not necessarily so limited, various aspects may be appreciated through a discussion of examples using such exemplary contexts.

According to various example embodiments, a bracket includes gripping of locking mechanisms that facilitate insertion of building materials such as siding, and that restrict withdrawal of the building materials after insertion. The bracket may include fasteners or be otherwise amenable to accepting fasteners (e.g., with features such as openings designed to interface with fasteners), for mounting to structural components. One-way locking mechanisms may be implemented, to facilitate passage of siding or other building materials into a space defined by the bracket. Once the siding or other building materials are passed into the one-way locking mechanisms, they are locked, or prevented, from being withdrawn in the direction opposite which they were inserted. For instance, locking tabs, pins, or other components can be utilized in this regard. In various embodiments, these components and the related bracket are implemented in a manner that allows insertion and locking of building materials of a variety of different shapes, thickness and overall sizes.

In particular embodiments, a gripping bracket is implemented to grip siding pieces, such as to grip a cut course of siding that abuts a structure such as a windowsill or soffit. The bracket may be metal (e.g., light gauge galvanized metal, aluminum, or stainless steel) or of other materials, and may function in a clip fashion. The gripping bracket includes tabs or other componentry that facilitate insertion of a siding piece into a space defined by the gripping bracket, and once inserted, restrict withdrawal of the siding piece from the gripping bracket. Such a gripping bracket may be utilized as siding undersill trim in exterior siding applications, in interior applications, and more. For instance, undersill trim may be applied under windows, soffits, or other structural components. By facilitating insertion of siding and restriction (locking) of the siding therein, installation can be rapid and provide a stable lock. Further, wind resistance can be enhanced, material and labor costs can be reduced, and adaptable installation can be effected for a diverse assortment of siding types and styles. For instance, cedar shake, scallop or wood composite siding may be used. Such approaches can also be implemented with other building materials, such as shingles, wallboard and more.

Another embodiment is directed to an apparatus including a bracket and grip fasteners. The bracket includes front, back and top sides, the front and back side being connected by the top side, the three of which form boundaries that bound three sides of an opening. The grip fasteners are coupled to the front side and to the back side and are configured with the bracket to facilitate insertion of the building material into a region of the opening bound by the front, back and top sides and past the grip fasteners in a direction toward the top side. The grip fasteners are further configured with the bracket to, after insertion of the building material, lock the building material in place by engaging with and preventing the building material from being withdrawn from the opening in a direction away from the top side.

The grip fasteners may be implemented in a variety of manners. In some embodiments, the grip fasteners operate in a first state in which the grip fasteners coupled to the front side are co-planar with the front side, and the grip fasteners coupled to the back side are co-planar with the back side. In a second state, the grip fasteners coupled to the front side are bent into the opening toward the back side, and the grip fasteners coupled to the back side are bent into the opening toward the front side. This operation may involve, for example, providing the bracket with grip fasteners integrated therein as shown in FIG. 2 in the first state, and then bending them (e.g., in the field) into positions similar to that shown in FIG. 1A.

The grip fasteners coupled to the front side may include a tab having a first edge connected to the front side and configured to bend into the opening, with remaining edges of the grip fasteners separated from the front side and extending away from the front side into the opening toward the back side. Similarly, the grip fasteners coupled to the back side may include a tab having a first edge connected to the back side and configured to bend into the opening, with remaining edges of the grip fasteners separated from the back side and extending away from the front side into the opening toward the front side. In some implementations, grip fasteners respectively coupled to the front side and to the back side are bent toward the opening.

The bracket may be shaped and applied in a variety of manners. In some embodiments, the bracket is in a shape defining a partial rectangle with the front side and back side being in parallel planes, and the top side being perpendicular to the front side and back side. Such a shape may involve a "J" shape defining the partial rectangle, for insertion into a J channel having a lip, as depicted as 160 in FIG. 1B, with the front side having a lower edge in contact with the lip and with the front, back and top side in contact with inner surfaces of the J channel. The bracket may, in this context, be utilized with a J channel as used in siding installation. In certain particular use case embodiments, the bracket is coupled to an external surface of a building (e.g., 170 of FIG. 1B) and used to accept siding introduced into the opening in a direction toward the top side, and to prevent removal of the siding from the opening in a direction away from the top side.

In some implementations, the grip fasteners include tabs having a first edge connected to the front side or to the back side, and remaining edges that extend into the opening with the tabs being bent into the opening. An upper edge nearest the top side is configured engaging with and locking to a surface of the building material, such as by introducing a serrated or wedged edge.

Another embodiment is directed to a method involving providing a bracket and a plurality of grip fasteners, and using the bracket and grip fasteners to secure building material. The bracket includes a front, back top sides, the front and back side being connected by the top side, all of which form boundaries that bound three sides of an opening. The grip fasteners include grip fasteners coupled to the front side and other grip fasteners coupled to the back side. Building material is inserted into a region of the opening bound by the front, back and top sides and past the grip fasteners in a direction toward the top side, and is locked in place by engaging the grip fasteners with and preventing the building material from being withdrawn from the opening in a direction away from the top side.

The grip fasteners coupled to the front side may be bent into the opening toward the back side, and the grip fasteners coupled to the back side may be bent into the opening toward the front side. When so arranged, locking the building material in place includes engaging edges of the bent grip fasteners with the building material such that applying force on the building material in a direction away from the top side applies a moment to the engaged edges of the bent grip fasteners in a direction toward the building material. For instance, each grip fastener may be bent along an edge thereof that is coupled whichever of the front or back side the grip fasteners is coupled to, with other edges of the grip fastener being free to bend into the opening.

The bracket may be provided or formed in a variety of manners. In some embodiments, the bracket is provided in a shape defining a partial rectangle with the front and back sides being in parallel planes and the top side being perpendicular to the front and back sides. Such a bracket may be inserted into a J channel having a lip, with the front side having a lower edge in contact with the lip and with the front, back and top side in contact with inner surfaces of the J channel.

The bracket may be utilized in a variety of applications. In some embodiments, the bracket is coupled to an external surface of a building. Siding is inserted into the opening in a direction toward the top side, and the siding is secured to the building by preventing removal of the siding from the opening in a direction away from the top side via the grip fasteners. This may involve, for example, coupling the bracket under a soffit or windowsill.

The bracket and grip fasteners may be formed in a variety of manners. In some embodiments, the bracket is formed by forming a sheet of metal into the shape of the bracket in a planar form, and removing some of the sheet of metal to form respective edges of the grip fasteners within an interior region of the sheet of metal. An edge of each grip fastener is left coupled to the sheet of metal. The sheet of metal is bent to form the front, back and top sides, with the front and back sides being in offset parallel panes, the top side being perpendicular to the front and back sides, and the grip fasteners being in the front and back sides.

Figure 1B:
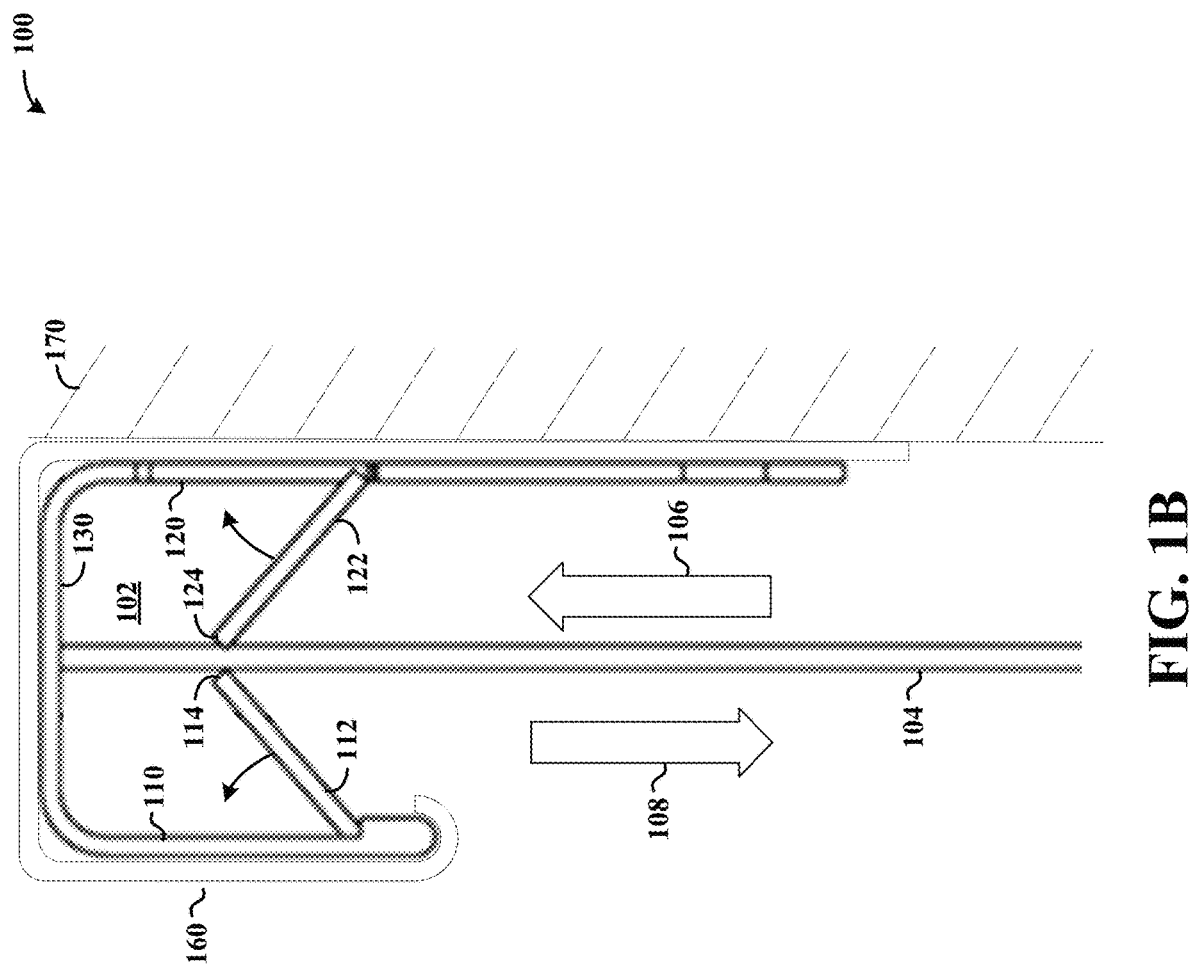
Figure 1C:
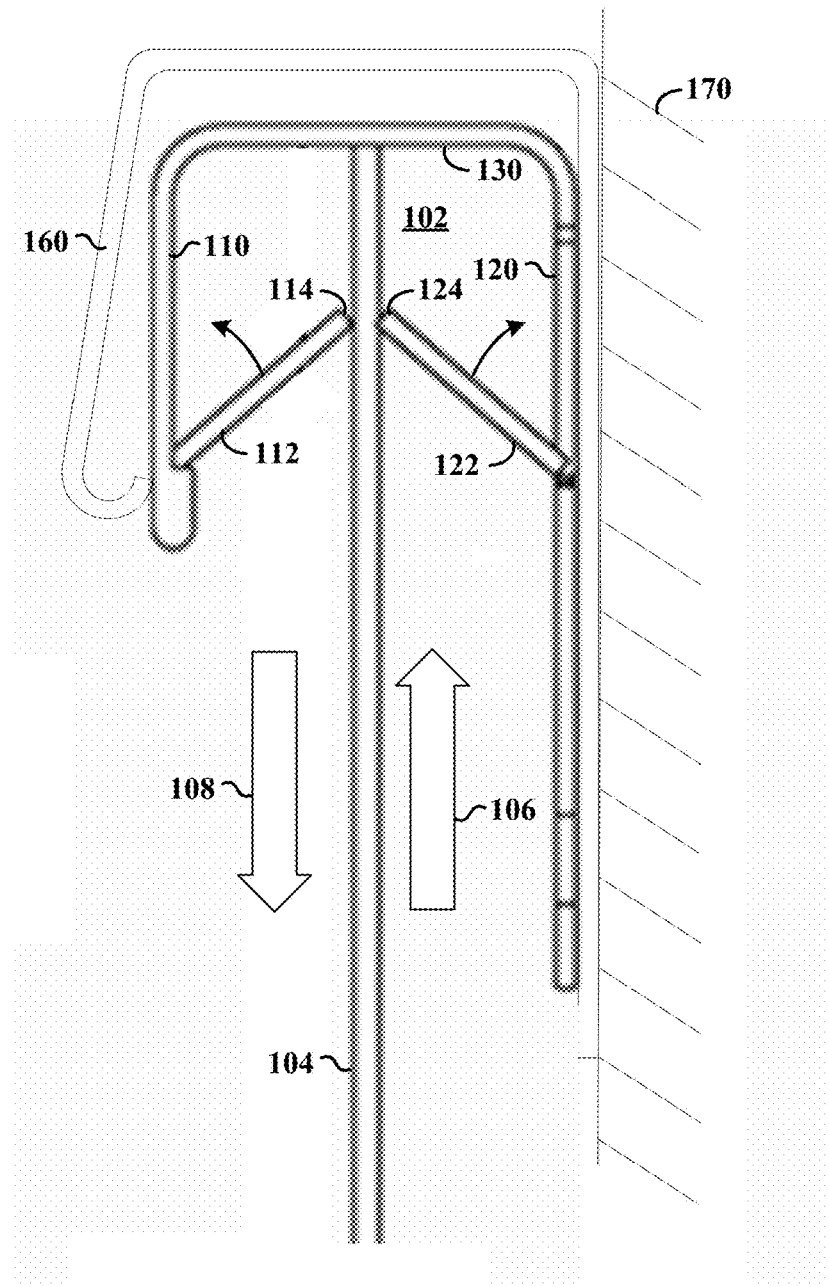
Figure 2:
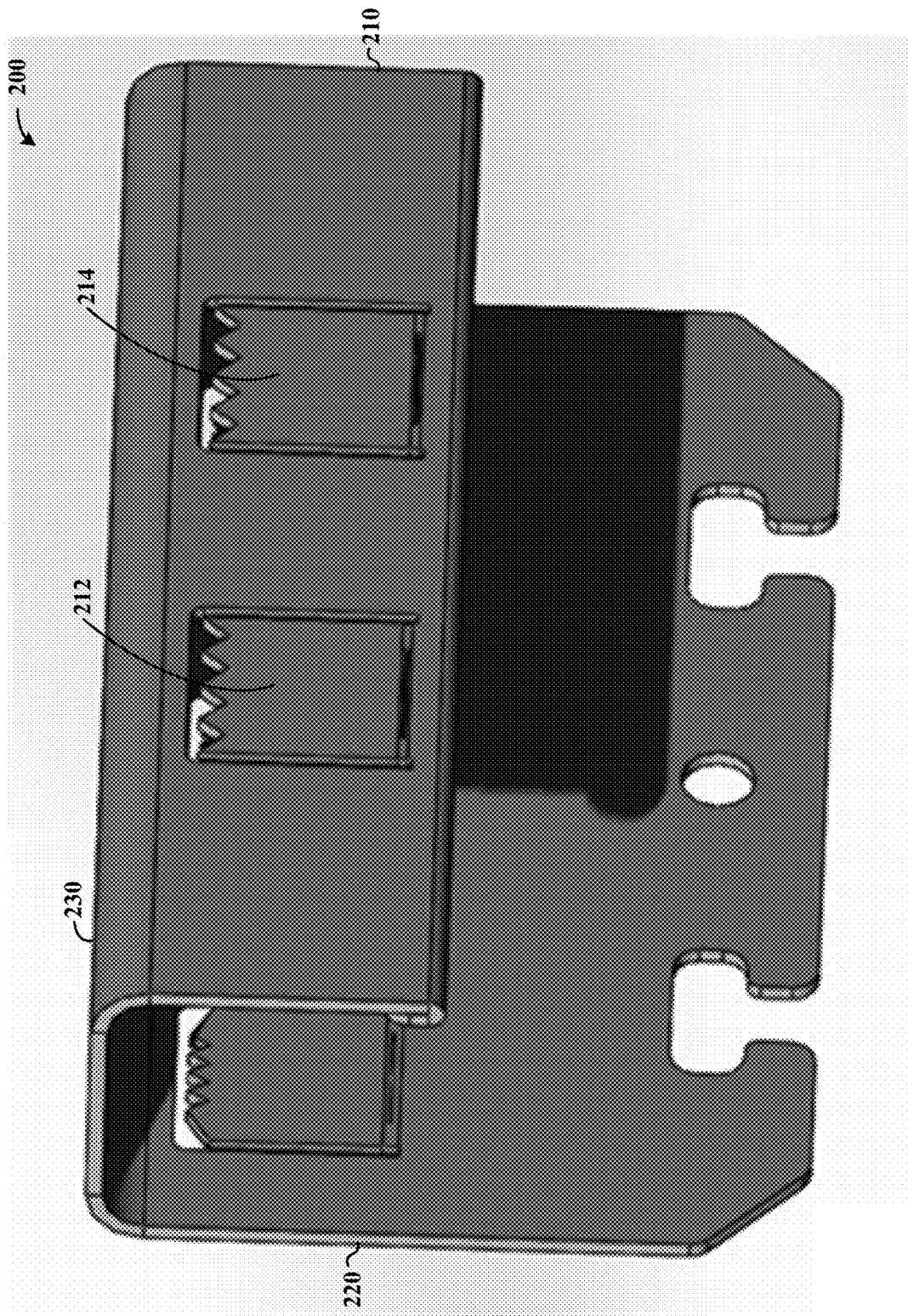
FIG. 2 shows a perspective view of another gripping bracket, as may be implemented in accordance with one or more embodiments.

Turning now to the Figures, FIGS. 1A-1C show perspective and respective end views of a gripping bracket 100, in accordance with one or more embodiments. The bracket 100 has a front side 110 and a back side 120 that define an opening 102, which is further confined by a top side 130 of the bracket. The front side 110 and back side 120 of the bracket include gripping components, respectively represented by tabs 112 and 122. Structures 140 and 142, and hole 150, may be utilized to facilitate coupling of fastener such as nails to the bracket 100, such as when implemented with other building materials such as J channels. In such applications, the length of the front side 110 and top side 230 can be set to fit snugly into an intended J channel size, such as J channel 160 (and as would bend as shown in FIG. 1C in order to facilitate such a snug fit).

Referring to FIG. 1B, when building material such as siding 104 is inserted into the opening 102 in the direction of arrow 106, the tabs 112 and 122 respectively flex toward front side 110 and back side 120 as shown by the arrows of rotation, allowing the siding to pass into the opening 102 beyond the tabs and toward top side 130. Once a portion of the building material is inserted past the tabs 112 and 122, ends 114 and 124 of the tabs (shown in FIG. 1A as being serrated by way of example) rest against the building material 104 and lock it in place, preventing the building material from being withdrawn in a direction of arrow 108.

The tabs may, for example, be formed with the front side 110 and the back side 120, for example from flat stock that also includes top side 130 and is subsequently bent into the shape as shown. A cut can be made around the respective tabs to separate three sides of each tab from the stock from which they are formed. Referring to tab 122 by way of example, a connection region 123 (e.g., with relief cuts) may facilitate bending of the tab inward as shown, from a manufactured position in which the tab is coplanar with the back side 120. Further, the degree of bend can be set in the field during use, to accommodate a particular thickness of building material. For instance, if building material 104 is implemented with a much thicker material (e.g., 4 or more times as thick), the tabs 112 and 122 can be bent accordingly.

A variety of other locking components may be used with and/or as an alternative to tabs 112 and 122. For instance, pins, wedges and other shapes may be used, as may one-way locking rollers or other mechanical locking components.

In various embodiments, a gripping bracket such as that shown in FIGS. 1A and 1B is designed to accommodate a variety of thicknesses of siding, as well as a variety of siding profiles, for use in a variety of applications including new construction, remodel, or repair. For instance, a piece of sill trim that fails can be removed, the bracket can be installed into an existing J channel, and the siding can be snapped back into place via the bracket. Tabs 112 and 122 may allow the cut course of siding to rest anywhere inside the opening 102 (e.g., with the bracket inserted into a J channel), depending on the location of the cut relative to the panel profile. For example, if a panel is cut near a half inch profile of ship lap siding, the tabs on the front side 110 can be bent inward about 30 degrees from vertical and the tabs on the back side 120 bent inward 60 degrees from vertical. In other implementations, the tabs on the back side 120 may be bent 90 degrees from vertical, pushing the building material 104 toward the front side 110 and using the tabs in the front side to engage with and lock the building material. Similarly, the tabs in the front side 110 may be bent to a greater angle than those on the back side 120, to suit particular applications.

FIG. 2 shows a perspective view of another gripping bracket 200, as may be implemented in accordance with one or more embodiments. The bracket 200 has front side 210, back side 220 and top side 230 that form a channel for inserting building material. Tabs 212 and 214 in the front side 210, and similar tabs in the back side, operate to secure building materials in a manner similar to that which is shown in FIG. 1B.

Figure 3:
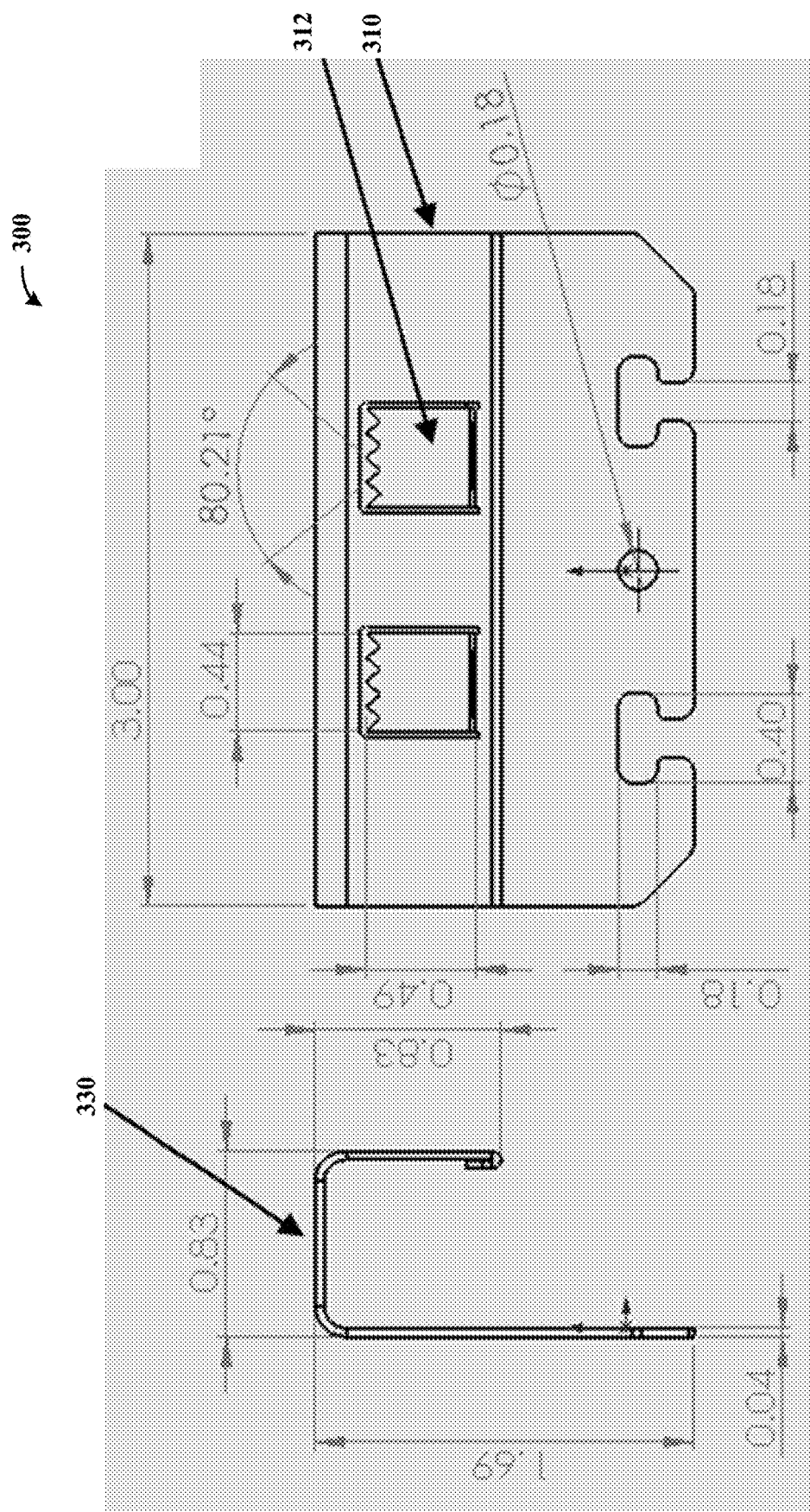
FIG. 3 shows front and end views of another gripping bracket with exemplary dimensions, as may be implemented in accordance with one or more embodiments.

FIG. 3 shows front and end views of another gripping bracket 300 with exemplary dimensions, as may be implemented in accordance with one or more embodiments. Front view 310 shows two bendable tabs, including tab 312, in a surface extending 3 inches in width and 1.69 inches in height. The tabs are shown with 80 degree serrations, and as having a width of 0.44 inches. Other dimensions are provided as shown. End view 330 shows the gripping bracket 300 as having a width of 0.83 inches, and a back side with of 0.083 inches as well. These dimensions may be tailored for particular applications, such as for fitting inside a J channel without necessarily using any fasteners to hold the bracket 300 therein.

Based upon the above discussion and illustrations, those skilled in the art will readily recognize that various modifications and changes may be made to the various embodiments without strictly following the exemplary embodiments and applications illustrated and described herein. For example, the brackets as shown can be made with fewer or more finger tabs, smooth or serrated finger tabs, wider or thinner finger tabs, or other locking mechanisms. Such modifications do not depart from the true spirit and scope of various aspects of the invention, including aspects set forth in the claims.

What is claimed is:

1. An assembly comprising:
   a J channel having front and back inner surfaces facing one another and a top inner surface that connects the front and back inner surfaces, and having a lip extending from a bottom edge of the front inner surface towards the back inner surface;
   a bracket including a front side having an inner surface, a back side contacting the back inner surface and that opposes the front side and having an inner surface that is parallel to and faces the inner surface of the front side, and a top side that connects front side and the back side and having an inner surface that faces an area between the inner surfaces of the front and back sides;
   front grip fasteners having a first edge connected to the front side;
   back grip fasteners having a first edge connected to the back side, the back grip fasteners being offset laterally relative the front grip fasteners to facilitate bending of the grip fasteners in both sides toward the opposite side and past the grip fasteners in the opposite side, wherein:
   in response to material being inserted between the grip fasteners and the front and back sides in a direction toward the inner surface of the top side, the grip fasteners are configured to bend toward the inner surface of the side to which they are connected to permit passage of the material beyond the grip fasteners in a direction toward the top side; and after said insertion of the material, lock the material in place by engaging the grip fasteners with opposing surfaces of the material and applying force in a direction toward the top side.

2. The assembly of claim 1, wherein the front side of the bracket has a vertical dimension that is less than a vertical dimension of the front inner surface extending between the top inner surface and the lip, therein locking the bracket into the J channel.

3. The assembly of claim 2, wherein the J channel is configured to receive the bracket by bending the front inner surface away from the back inner surface and, upon insertion of the front side toward the top inner surface and beyond the lip, move the lip toward the back inner surface and lock the bracket into the J channel.

4. The assembly of claim 1, wherein the grip fasteners are configured to:
   operate in a locked state in which the grip fasteners coupled to the front side are and the grip fasteners coupled to the back side extend toward one another such that a gap extends laterally between the grip fasteners in a direction extending between the front and back sides; and
   operate in an unlocked state in which the grip fasteners coupled to the front side are bent toward the back side past a top edge of the grip fasteners connected to the back side, and in which the grip fasteners coupled to the back side are bent toward the front side past a top edge of the grip fasteners connected to the front side.

5. The assembly of claim 1, wherein each of the grip fasteners includes a first edge connected respectively to the front or back side to which they are connected, and is configured to bend into the opening with remaining edges of the grip fasteners separated from the side to which their first edge is connected and extending toward the opposing side.

6. The assembly of claim 1, wherein the J channel is coupled to an external surface of a building and wherein the bracket is configured to accept siding introduced into the opening in a direction toward the top side, and to prevent removal of the siding from the opening in a direction away from the top side, therein locking the siding to the external surface of the building.

7. The assembly of claim 1, wherein the grip fasteners include tips at ends thereof configured to, upon insertion of the material past the grip fasteners, prevent removal of the material by penetrating a surface thereof.

8. An assembly comprising:
   a J channel having front and back inner surfaces facing one another and a top inner surface that connects top edges of the front and back inner surfaces, and having a lip extending from a bottom edge of the front inner surface towards the back inner surface;
   a bracket including:
      a front side having an inner surface,
      a back side that opposes the front side and having an inner surface that is parallel to and faces the inner surface of the front side,
      a top side that connects front side and the back side and having an inner surface that faces an area between the inner surfaces of the front and back sides, and
      a plurality of fasteners in the front and back sides, the fasteners being configured to secure material inserted between the fasteners in a direction toward the top side by engaging with opposing surfaces of the material and applying force in a direction toward the top side; and
   wherein the bracket is configured and arranged with the J channel to lock the bracket into the J channel by, with the back side engaged with the back inner surface of the J channel:
      bending the front inner surface away from the back inner surface in response to inserting the bracket between the front and back inner surfaces in a direction toward the top inner surface and in response to applying pressure with the bracket to the lip in a direction away from the back side, and
      in response to the front side being inserted past the lip and therein relieving the pressure applied to the lip, returning the lip toward the back inner surface and therein locking the bracket into the J channel via the front side extending vertically between the top inner surface and the lip.

9. They assembly of claim 8, wherein the fasteners include:
   front grip fasteners having a first edge connected to the front side; and
   back grip fasteners having a first edge connected to the back side, the back grip fasteners being offset laterally relative the front grip fasteners to facilitate bending of the grip fasteners in both sides toward the opposite side and past the grip fasteners in the opposite side.

10. The assembly of claim 9, wherein the grip fasteners are configured to:
   in response to the material being inserted between the grip fasteners and the front and back sides in a direction toward the inner surface of the top side, bend toward the inner surface of the side to which they are connected to permit passage of the material beyond the grip fasteners in a direction toward the top side; and
   after said insertion of the material, lock the material in place by engaging the grip fasteners with opposing surfaces of the material and applying force in a direction toward the top side.

11. The assembly of claim 8, wherein the fasteners are configured to:
   operate in a locked state in which the fasteners coupled to the front side are and the fasteners coupled to the back side extend toward one another such that a gap extends laterally between the fasteners in a direction extending between the front and back sides; and
   operate in an unlocked state in which the fasteners coupled to the front side are bent toward the back side past a top edge of the fasteners connected to the back side, and in which the fasteners coupled to the back side are bent toward the front side past a top edge of the fasteners connected to the front side.

12. The assembly of claim 8, wherein each of the fasteners includes a first edge connected respectively to the front or back side to which they are connected, and is configured to bend into the opening with remaining edges of the fasteners separated from the side to which their first edge is connected and extending toward the opposing side.

13. The assembly of claim 8, wherein the J channel is coupled to an external surface of a building and wherein the bracket is configured to accept siding introduced into the opening in a direction toward the top side, and to prevent removal of the siding from the opening in a direction away from the top side, therein locking the siding to the external surface of the building.

14. The assembly of claim 8, wherein the fasteners include tips at ends thereof configured to, upon insertion of the material past the fasteners, prevent removal of the material by penetrating a surface thereof.

15. A method comprising:
providing a bracket including:
- a front side having an inner surface,
- a back side that opposes the front side and having an inner surface that faces and is parallel to the inner surface of the front side,
- a top side that connects front side and the back side and having an inner surface that faces an area between the inner surfaces of the front and back sides, and
- a plurality of fasteners in the front and back sides;

inserting the bracket into a J channel having front and back inner surfaces facing one another and a top inner surface that connects top edges of the front and back inner surfaces, with the back side of the bracket in contact with the back inner surface, the J channel also having a lip extending from a bottom edge of the front inner surface towards the back inner surface, wherein inserting includes:
- inserting the bracket between the front and back inner surfaces in a direction toward the top inner surface by bending the front inner surface away from the back inner surface, including applying pressure with the front side of the bracket to the lip in a direction away from the back side, and
- with the front inner surface bent away from the back inner surface, continuing to insert the bracket toward the top inner surface until the front side is inserted past the lip, therein relieving the pressure applied to the lip and causing the front side to return toward the back inner surface, therein locking the bracket into the J channel via an interface between the lip and a bottom edge of the front side; and inserting material between the fasteners in a direction toward the top side by engaging with opposing surfaces of the material and applying force in a direction toward the top side, therein locking the material to the bracket and the J channel.

16. The method of claim 15, wherein:
providing the bracket includes providing a first set of the fasteners coupled to the front side and a second set of the fasteners coupled to the back side, each of the fasteners being offset laterally relative to one another with ends of the fasteners in the front side bent toward the back side and past ends of the fasteners in the back side; and
inserting material between the fasteners includes using the material to bend the ends of the fasteners toward the side to which they are coupled to provide space for the material to pass through the fasteners, and pushing a top end of the material past the fasteners in a direction toward the top side.

17. The method of claim 15, further including coupling the J channel to an external surface of a building, wherein inserting the material between the fasteners includes inserting siding between the fasteners and securing the siding to the building by applying a force to the siding with the fasteners in a direction toward the top side.

18. The method of claim 15, wherein:
inserting material between the fasteners includes bending the fasteners toward the side to which they are connected to permit passage of the material beyond the fasteners in a direction toward the top side; and
locking the material to the bracket and the J channel includes engaging the fasteners with opposing surfaces of the material and applying force in a direction toward the top side.

19. The method of claim 15, wherein each of the fasteners includes a first edge connected respectively to the front or back side to which they are connected, and is configured to bend into the opening with remaining edges of the fasteners separated from the side to which their first edge is connected and extending toward the opposing side.

20. The method of claim 15, wherein the fasteners include tips at ends thereof and wherein applying force in a direction toward the top side includes preventing removal of the material by penetrating a surface thereof and therein locking the material into the bracket and J channel.

\* \* \* \* \*